United States Patent Office 3,234,793
Patented Feb. 15, 1966

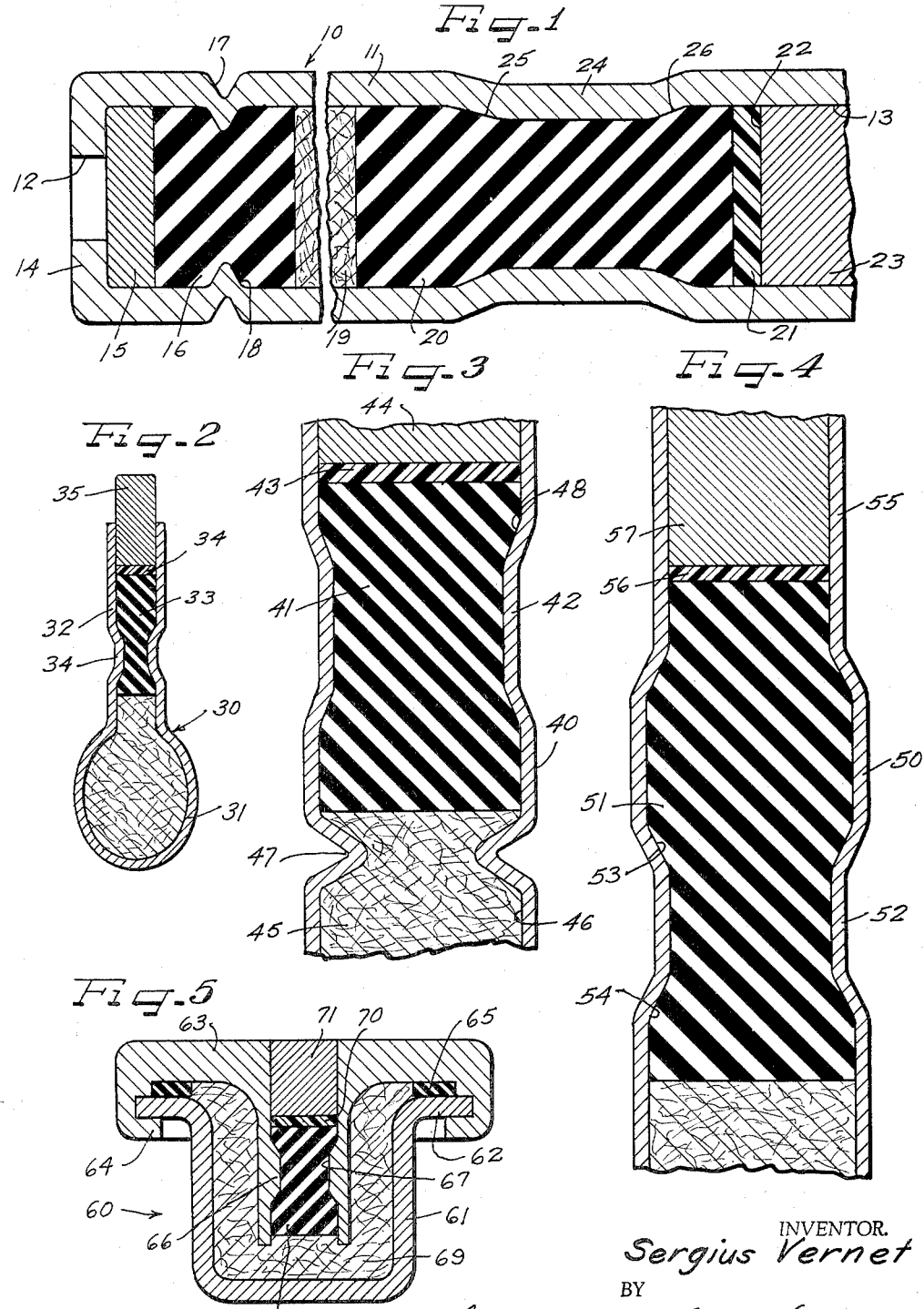

3,234,793
TEMPERATURE RESPONSIVE FORCE
TRANSMITTING DEVICE
Sergius Vernet, Yellow Springs, Ohio, assignor to Antioch College, Yellow Springs, Ohio, a corporation of Ohio
Filed May 14, 1962, Ser. No. 194,483
13 Claims. (Cl. 73—368.3)

This invention relates to thermal responsive elements or temperature responsive force transmitting devices and is more particularly directed to an improved means for sealing such devices so that the substances employed therein will not escape therefrom and so that foreign matter cannot gain entry to the interior thereof. Still further, my invention is directed to improved temperature responsive force transmitting devices employing such sealing arrangements, and is especially directed to so-called "pencil" type actuators.

Thermal responsive elements are now widely used as a means for energizing a wide variety of components as a function of changes in ambient temperature. They may, for instance, be employed in fluid mixing valves, automatic ice making mechanisms, heater controls, household zone valves, washers, driers, fire warning devices, hot water heaters, waterline thermostats, and the like. In many applications, as in those instances in which such units are employed for safety reasons, it is of the utmost importance that the units operate satisfactorily when their operating temperature has been reached even though the unit may have remained inoperative over a long period of time.

It has been found that many temperature responsive force transmitting devices become inoperative or fail to operate properly in their operating ranges as a result of faulty seals. Rubber or rubber-like plugs may be used in the place of diaphragms to form a seal between the temperature responsive substance and the power member or piston in ordinary thermal sensitive elements or in the so-called pencil elements. The plugs may contract slightly as a result of various factors (such, for instance, as exposure to cold temperatures) and this contraction of the plugs causes leaks to develop between the plugs and the walls of their respective casings. Depending upon the circumstances, the temperature sensitive substance within the casing may seep past the seal or, conversely, foreign matter may seep past the seal from the outside to the chamber within which the temperature sensitive substance is contained. In either event, the temperature responsive force transmitting device will not thereafter operate within its intended range. It should also be noted that this leakage problem may present itself in those instances in which the temperature responsive force transmitting device is used in a high pressure fluid system in such a manner that the plug is exposed to the high pressure fluid.

I have devised a seal for a temperature responsive force transmitting device which obviates each of the above noted objectionable characteristics of prior types of thermal responsive elements. Each of the temperature responsive force transmitting devices illustrated in the drawings constitutes a different embodiment of my invention but all of these units have in common the fact that a positive seal is provided to seal in the temperature sensitive substance so that it obviates the above noted objectionable features of its prior counterpart, if any, in this art. In view of the foregoing, it is a principal object of my invention to provide an improved temperature responsive force transmitting device employing a positive seal to seal in the temperature responsive substance contained therein.

Another object of my invention resides in the provision of a novel means for sealing in a temperature responsive substance in an open ended conduit.

As will be hereafter pointed out, another object of my invention is directed to the provision of a positive seal for sealing in the temperature responsive substance within the casing of a temperature responsive force transmitting device which, in addition, acts as a motion amplifier.

Another object of my invention is directed to the provision of a temperature responsive force transmitting device employing a seal of the type above described and, in addition, employing means for preventing movement of the seal within the casing in at least one direction.

These and other objects and advantages of my invention will become apparent from time to time as the following specification proceeds and with reference to the accompanying drawings, wherein:

FIGURE 1 is a fragmentary vertical sectional view taken through a pencil type temperature responsive force transmitting device constructed in accordance with the principles of my invention;

FIGURE 2 is a vertical sectional view through another thermal sensitive element constructed in accordance with my invention;

FIGURE 3 is a fragmentary vertical sectional view through a portion of a pencil type temperature responsive force transmitting device and illustrating another feature of my invention;

FIGURE 4 is another fragmentary vertical sectional view through a pencil type temperature responsive force transmitting device showing the plug used as a combined seal and motion amplifier; and FIGURE 5 is a vertical sectional view through a cup type temperature responsive force transmitting device having a piston guide extending into the interior of the cup.

In FIGURE 1 I have shown a pencil type temperature responsive force transmitting device or thermal sensitive element 10 having a tubular casing 11 with opposed open ends 12 and 13. An inturned flange 14 formed integrally with the tubular casing 11 defines the open end 12 and serves as a seat for disc 15. The tubular casing 11 and disc 15 may be formed of the same material and such material will preferably constitute a thermally conductive metal although various applications may dictate the use of other particular materials. A deformable plug 16 preferably resilient and preferably formed of rubber or a rubber-like material is fitted within the left-hand end of the casing 11 and is seated upon the disc 15. In order to provide a fluid tight seal at the plug 16, the casing 11 is circumferentially crimped as at 17 to provide an inwardly extending bead 18 which acts to circumferentially compress a midportion of the plug 16. Compression of the plug 16 to the point illustrated in FIGURE 1 assures the formation of a positive fluid tight seal at this point.

A thermal sensitive substance or expansion material 19 is disposed within the casing 11 and may comprise one of any number of known types of materials used in temperature responsive force transmitting devices. Such expansion materials generally consist of a wax or of a metal powder impregnated wax but liquids or other materials such as mercury and the like could be employed equally as well.

A deformable plug, preferably but not necessarily resilient, is fitted within the casing 11 near the open end 13 thereof to seal the expansion material 19. The plug 20 is somewhat more elongated than the plug 16 and is preferably formed of a rubber or rubber-like material. An anti-chafing disc 21 formed of a wear resistant soft plastic is seated on the outer end of the plug 20 and acts, in turn, as a seat for the innermost end 22 of a power member or piston 23. The piston 23 is guided in the open end 13 of the casing 11 and is adapted to move extensively from the casing 11 upon expansion of the substance 19. As is well known in the art, expansion of the substance 19 will act to move the plug 20 along the inner wall of the casing 11 and thereby force the piston 23 to move extensively from the casing 11. The straight side wall of the casing 11 at the open end 13 thereof acts as a guide for the piston 23.

Before proceeding further, several things must be borne in mind. First, it is very important for reasons already noted that a positive fluid tight seal be provided between the plug 20 and the inner wall of the casing 11. Such a seal was provided at the plug 16 by sharply inwardly crimping the side wall of the casing 11. It must, however, also be borne in mind that it is the function of the plug 20 to move along the wall of the casing upon expansion of the substance 19. Accordingly, the provision of a sealing crimp at the plug 20 such as that which is provided at the plug 16 would not be possible because movement of the plug along the casing wall would be thereby prevented.

I have found that by indenting or necking in a portion of the casing wall surrounding the plug movement of the plug within the casing will not be prevented but a considerably better seal will be provided. I provide an elongated neck 24 in the casing surrounding the plug 20 by circumferentially indenting the casing at that point. The neck 24 is defined by a pair of spaced shoulders 25 and 26 which gradually diverge from the neck out to the inner walls of the remainder of the casing. The opposed ends of the plug 20, of course, extend in each direction beyond the shoulders 25 and 26. The slight indentation of the casing 11 around the plug 20 puts a considerable compression load on the plug 20 and increases the plug-casing contact pressure to a marked degree at the identation thereby providing an improved seal.

More important, however, is the fact that contraction of the plug 20 will act to move the walls of the plugs more and more tightly into engagement with the shoulders 25 and 26. It is plug contraction which most often is the cause for sealing plug failure. In devices constructed in accordance with my invention, plug contraction will merely act to increase the effectiveness of the seal. Conversely, expansion of the plug would simply act to put a greater compression load on it and thus force the plug more tightly into engagement with the inner wall of the casing.

It will be observed that upon contraction of the plug (such as might be caused by exposure to cold temperatures) the intensity with which the side wall thereof is forced into engagement with the shoulders 25 and 26 will be a direct function of the force generated by contraction of the plug over that portion thereof lying between the shoulders 25 and 26. It is for this reason that I have provided an elongated neck 24. If a simple crimp were put in the side wall of the casing 11 about the plug 20, the distance between the shoulders would be very small and the force generated by contraction of that portion of the plug would not be great enough to provide a tight seal against the shoulders. By increasing the distance between shoulders the force generated by contraction of the plug intermediate those shoulders thereby increases.

It will still be observed, however, that the slope of the shoulders 25 and 26 is not great and that the plug 20 is still free to move within the casing 11 upon expansion of the substance 19 to force the piston 23 to move extensively from the casing 11.

In FIGURE 2 I have illustrated a bulbous pencil element 30 which includes a casing 31 in the form of a bulb and an integral piston guide 32 extending therefrom having a resilient plug 33 fitted therein. A wide circumferential indentation 34 is formed in the guide 32 around the plug 33 to provide a seal in the manner already described. Likewise, an anti chafing disc 34 is seated on the plug 33 and serves, in turn, as a seat for a power member or piston 35 which is slidably guided within the upper end portion of the guide 32.

FIGURE 3 fragmentarily illustrates the upper end portion of a tubular piston guide 40 having a resilient plug 41 seated therein and having a circumferential wide indentation 42 formed therein around the plug 41. An anti-chafing disc 43 is seated on the upper end of the plug 41 and serves, in turn, as a seat for the lower end portion of a piston 44. The plug 42 serves to seal in a thermal sensitive substance or expansion material 45 within a chamber 46 formed within the casing 40 below the plug 41. In this embodiment of my invention I have provided a sharp, deep crimp 47 circumferentially of the casing 40 at a point immediately below the lowermost end of the plug 41. The depth of the crimp 47 must be great enough to prevent movement of the plug therepast but the sharp angle formed by the crimp is the critical factor which serves to prevent the possibility of movement of the plug 41 downwardly within the casing 40. Such movement could be caused as a result of a combination of factors such as the force of pressure acting upon the upper end of the plug 41 and contraction of the expansion material 45. Such movement of the plug 41 is undesirable, of course, since the plug might move far enough downward in the casing 40 that the plug mould move past the shoulder 48 formed at the upper end of the indentation 42. If this happened the effectiveness of the seal to withstand temperature variances below the operating range of the expansion material 45 would be lost.

Referring to the embodiment shown in FIGURE 4 of the drawings, the tubular casing 50 of a temperature responsive force transmitting device has an elongated resilient plug 51 seated therein. The casing and plug cooperate to provide a fluid tight seal for the expansion material below the plug and also cooperate to act to amplify the motion generated by expansion of the expansion material. It will be observed that the main body of the casing 50 has a diameter D and that the casing is provided with a wide circumferential indentation 52 around the plug 51 which provides shoulders 53 and 54 to effectuate the tight seal hereinbefore described. Unlike the other embodiments of my invention, however, the piston guide portion 55 of the tubular casing 50 has a diameter equal to only two-thirds D. The plug 51 extends up into the small diameter guide portion 55 and has an anti-chafe disc 56 and piston 57 seated thereon in the ordinary manner. Since the diameter of the guide 55 is smaller than the diameter D of the casing 50 at the point where the expansion material contacts the plug 51, any upward movement of the lower end of the plug 51 caused by expansion of the expansion material will be amplified when it is transmitted to the piston 57 in the sense that the length of travel of the piston 57 caused by such expansion will exceed the distance which the lower end of the plug 51 moves. The force output of course is not amplified but piston travel distance is so amplified. The concept of motion amplification in temperature responsive force transmitting devices is well understood by those skilled in this art and so need not here be further described. Of course, a motion amplifying pencil element might be formed by employing a generally cylindrically shaped casing having a necked-in portion at one end and having an indented portion intermediate the necked-in portion and the main body of the casing and seating a plug within the casing extending into the main body, indented portion, and the necked-in portion of the casing.

Lastly, in FIGURE 5 I have shown a cup type temperature responsive force transmitting device 60 comprising a cup 61 having a flange 62 formed about the lip thereof and having a closure cap 63 seated thereon and secured thereto by means of a plurality of inturned lugs 64 extending beneath and gripping the flange 62. An annular seal 65 is interposed between the closure cap 63 and the flange 62 and serves to provide a positive fluid tight seal therebetween. In this embodiment of my invention a piston guide 66 is formed integrally with the closure cap 63 but extends into the interior of the cup 61 in an unorthodox but highly advantageous manner. The inner wall of the guide 66 has an elongated narrow neck 67 formed therein at a point surrounding a resilient plug 68 to provide a positive but movable seal for sealing in the expansion material 69 within the cup 61. An anti-chafe disc 70 and piston 71 are fitted within the guide 66 on the upper end of the plug 68 in the ordinary manner. It will be observed that the uppermost end of the piston terminates at the upper surface of the closure cap 63 and that a very compact temperature responsive force transmitting device is thereby provided. This compactness is achieved by forming the piston 71 so that it does not extend beyond the surface of the closure cap 63 and by forming the guide therefor within the interior of the cup 61. In addition, if the depending guide 66 is formed of a thermally conductive material I have observed that it will increase the speed and effectiveness with which the temperature responsive force transmitting device acts within its operating range since it will increase heat conduction through the expansion material.

It will be understood that these embodiments of my invention have been used for illustrative purposes only and that various modifications and variations in my invention may be effected without departing from the spirit and scope of the novel concepts thereof.

I claim as my invention:

1. A temperature responsive motion transmitting device which comprises:
   a casing having an expansion material contained therein, the volume of which material changes upon changes in temperature thereof;
   an elongated guide opening to the interior of said casing and having an internal necked-in portion defined by a elongated and essentially straight inner wall;
   spaced outwardly flared shoulders extending completely around the interior of said guide at opposite ends of said necked-in portion defining an obtuse angular slope with the inner side wall of said guide beyond each end of said necked-in portion;
   a resilient plug seated within said guide at said necked-in portion having portions thereof disposed in juxtaposition with each of said shoulders;
   wherein the force exerted by thermal expansion of said material will cause said plug to move within said guide.

2. A temperature responsive motion transmitting device which comprises:
   a casing having an expansion material contained therein, the volume of which material changes upon changes in temperature thereof;
   an elongated guide opening to the interior of said casing opening to the interior of said casing and having an internal necked-in portion defined by an elongated and essentially straight inner wall;
   spaced outwardly flared shoulders extending completely around the interior of said guide at opposite ends of said necked-in portion defining an obtuse angular slope with the inner side wall of said guide beyond each end of said necked-in portion;
   a sealing plug seated within said necked-in portion of said guide and having opposed ends extending in opposite directions beyond each of said shoulders;
   wherein the force exerted by thermal expansion of said material will cause said plug to move within said guide.

3. A temperature responsive motion transmitting device which comprises:
   a generally cylindrical tube having opposed closed and open ends;
   an expansion material within said tube adjacent the said closed end thereof, the volume of which material changes upon changes in temperature thereof;
   a piston slidably guided within the said open end of said tube;
   a neck formed by the inner wall of said tube intermediate the said ends thereof, defined by an elongated and essentially straight inner wall of said tube;
   spaced outwardly flared shoulders extending completely around the interior of said tube at opposite ends of said neck defining an obtuse angular slope with the inner side wall of said tube beyond each end of said neck;
   a resilient plug seated within said tube at said neck having portions thereof disposed in juxtaposition with each of said shoulders and having an end portion positioned adjacent an end of said piston;
   whereby expansion of said material will cause said plug and piston to move slidably within said tube.

4. A temperature responsive motion transmitting device which comprises:
   a generally cylindrical tube having opposed open ends;
   a compressible plug seated within said tube adjacent one end thereof to close that end of said tube;
   a crimp formed about said tube adjacent said plug compressing said plug about its entire circumference to provide a fluid tight seal between said tube and said plug;
   an expansion material within said tube adjacent the plugged end thereof, the volume of which material changes upon changes in temperature thereof;
   a piston slidably guided within the said open end of said tube;
   a neck formed by the inner wall of said tube intermediate the said ends thereof, defined by an elongated and essentially straight inner wall of said tube;
   spaced outwardly flared shoulders extending completely around the interior of said guide at opposite ends of said neck defining an obtuse angular slope with the inner side wall of said tube beyond each end of said neck;
   a resilient plug seated within said tube at said neck having portions thereof disposed in juxtaposition with each of said shoulders and having an end portion positioned adjacent an end of said piston;
   whereby expansion of said material will cause said plug and piston to move slidably within said tube.

5. A temperature responsive motion transmitting device which comprises:
   a casing having an expansion material contained therein, the volume of which material changes upon changes in temperature thereof;
   an elongated guide opening to the interior of said casing and having an internal necked-in portion defined by an elongated and essentially straight inner wall;
   spaced outwardly flared shoulders extending completely around the interior of said guide at opposite ends of said necked-in portion defining an obtuse angular slope with the inner side wall of said guide beyond each end of said necked-in portion;
   a resilient plug seated within said guide at said necked-in portion having portions thereof disposed in juxtaposition with each of said shoulders;
   wherein the force exerted by thermal expansion of said material will cause said plug to move within said guide;
   and means preventing movement of said plug within said guide toward the end of said guide opening to the interior of said casing.

6. A temperature responsive motion transmitting device constructed in accordance with claim 5 in which said means comprises a circumferential sharp angular crimp in said guide adjacent an end of said plug.

7. A temperature responsive moton transmitting device which comprises:
   a generally cylindrical tube having opposed closed and open ends;
   an expansion material within said tube adjacent the said closed end thereof, the volume of which material changes upon changes in temperature thereof;
   a piston slidably guided within the said open end of said tube;
   a neck formed by the inner wall of said tube intermediate the said ends thereof, defined by an elongated and essentially straight inner wall of said tube;

spaced outwardly flared shoulders extending completely around the interior of said tube at opposite ends of said neck defining an obtuse angular slope with the inner side wall of said tube beyond each end of said neck;

a resilient plug seated within said tube at said neck having portions thereof disposed in juxtaposition with each of said shoulders and having an end portion positioned adjacent an end of said piston;

whereby expansion of said material will cause said plug and piston to move slidably within said tube; and means preventing movement of said plug in the direction of said material.

8. A temperature responsive motion transmitting device constructed in accordance with claim 7 in which said means comprises a circumferential sharp angular crimp in said tube adjacent an end of said plug.

9. A temperature responsive motion transmitting device which comprises:

a generally cylindrical tube having a closed end and having a relatively narrow necked open end;

an expansion material within said tube adjacent the said closed end thereof, the volume of which material changes upon changes in temperature thereof;

a piston slidably guided within the narrow necked portion of said tube;

a neck formed by the inner wall of said tube intermediate the said narrow necked portion and the said closed end of said tube and spaced from said narrow necked portion thereof;

wherein the diameters of said neck and said narrow necked portion of said tube are equal to or less than two-thirds the minimum diameter of the remainder of said tube;

spaced outwardly flared shoulders extending completely around the interior of said tube at opposite ends of said neck defining an obtuse angular slope with the inner side wall of said tube beyond each end of said neck;

a resilient plug seated within said tube and said neck having portions thereof disposed in juxtaposition with each of said shoulders;

wherein the force exerted by thermal expansion of said material will cause said plug and piston to move within said tube.

10. A temperature responsive motion transmitting device which comprises:

a cup having an expansion material contained therein, the volume of which material changes upon changes in temperature thereof;

a closure sealing the open end of said cup and having a guide formed integrally therewith and extending into the interior of said cup;

a neck formed by an inner wall of said guide intermediate the ends thereof defined by an elongated and essentially straight inner wall of said guide;

spaced outwardly flared shoulders extending obliquely around the interior of said guide at opposite ends of said neck defining an obtuse angular slope with the inner side wall of said guide beyond each end of said neck;

a resilient plug seated within said guide at said neck having portions thereof disposed in juxtaposition with each of said shoulders;

wherein the force exerted by thermal expansion of said material will cause said plug to move within said guide.

11. A temperature responsive motion transmitting device constructed in accordance with claim 10 wherein said guide is formed of thermal conductive material.

12. A temperature responsive motion transmitting device which comprises:

a casing having an expansion material contained in one section thereof, the volume of which material changes upon changes in temperature;

an elongated guide portion in said casing opening to the interior of the material containing section of said casing having an elongated necked-in portion;

two spaced outwardly flared shoulders formed in said guide portion at opposite ends of said elongated necked-in portion; and a sealing plug seated within said necked-in portion of said guide having opposed ends extending in opposite directions beyond each of said shoulders;

wherein force exerted by thermal expansion of said material will cause said plug to move within said guide.

13. A temperature responsive motion transmitting device which comprises:

a generally cylindrical tube having a closed end and having a relatively narrow necked open end;

an expansion material within said tube adjacent said closed end thereof, the volume of which material changes upon changes in temperature thereof;

a piston slidably guided within the narrow necked portion of said tube;

an intermediate necked-in portion formed by the inner wall of said tube between said narrow necked portion and said closed end of said tube and spaced from said narrow necked portion;

spaced outwardly flared shoulders extending completely around the interior of said tube at opposite ends of said intermediate necked-in portion defining an obtuse angular slope with the inner side wall of said tube beyond each end of said intermediate necked-in portion;

a resilient plug seated within said tube and said intermediate necked-in portion having portions thereof disposed in juxtaposition with each of said shoulders; and beyond wherein the force exerted by thermal expansion of said material will cause said plug and piston to move within said tube.

References Cited by the Examiner

UNITED STATES PATENTS

| 1,916,814 | 7/1933 | Shivers | 73—368.7 |
| 2,368,181 | 1/1945 | Vernet | 73—363 |
| 2,797,873 | 7/1957 | Woods | 73—368.3 |
| 2,931,390 | 4/1960 | Vernet | 137—789 |
| 2,986,936 | 6/1961 | Vernet | 73—358 |
| 3,016,691 | 1/1962 | Asakawa | 73—368.3 |

ISAAC LISANN, *Primary Examiner.*